SAMUEL R. McCUTCHEON
INVENTOR.

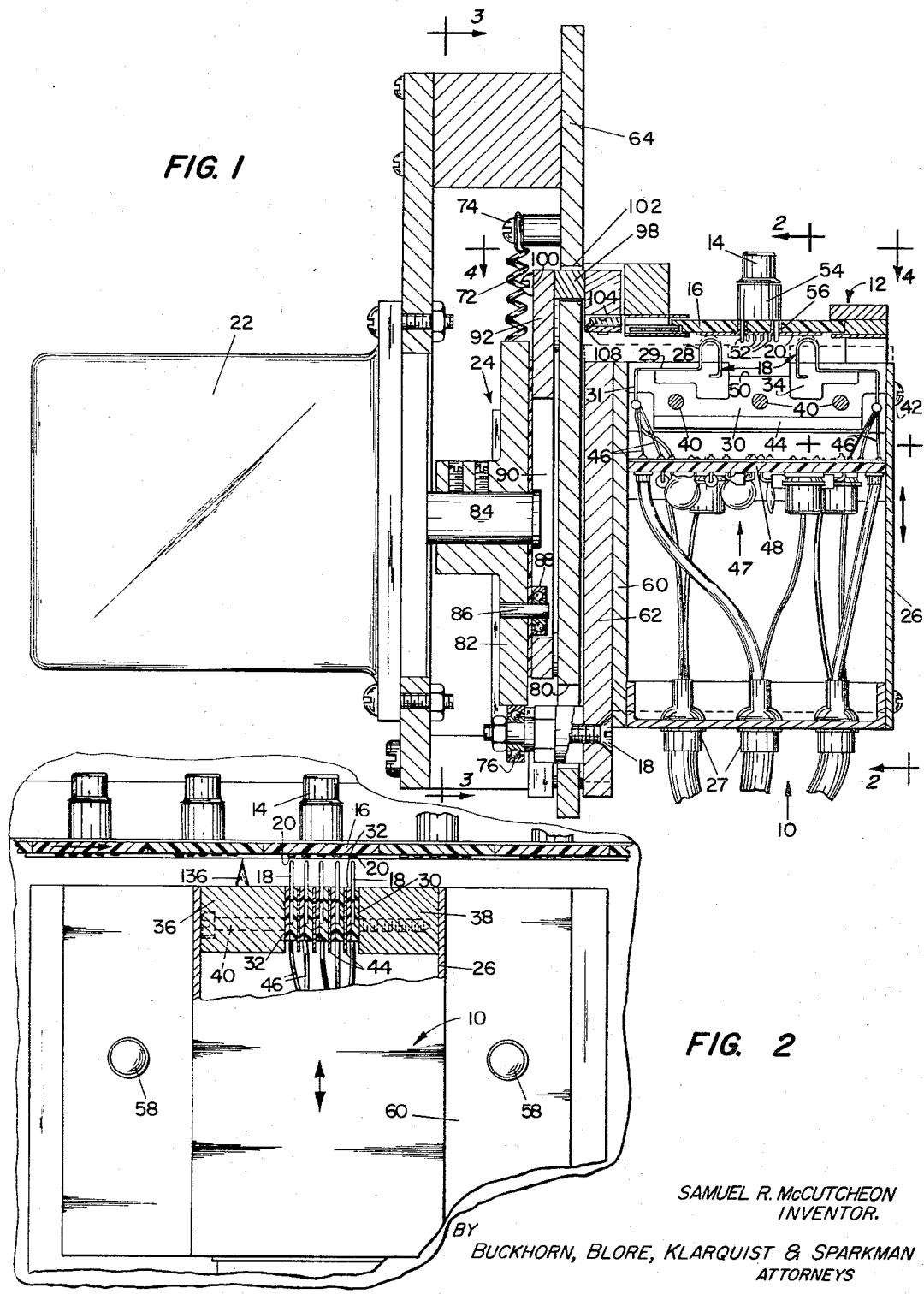

BY
BUCKHORN, BLORE, KLARQUIST & SPARKMAN
ATTORNEYS

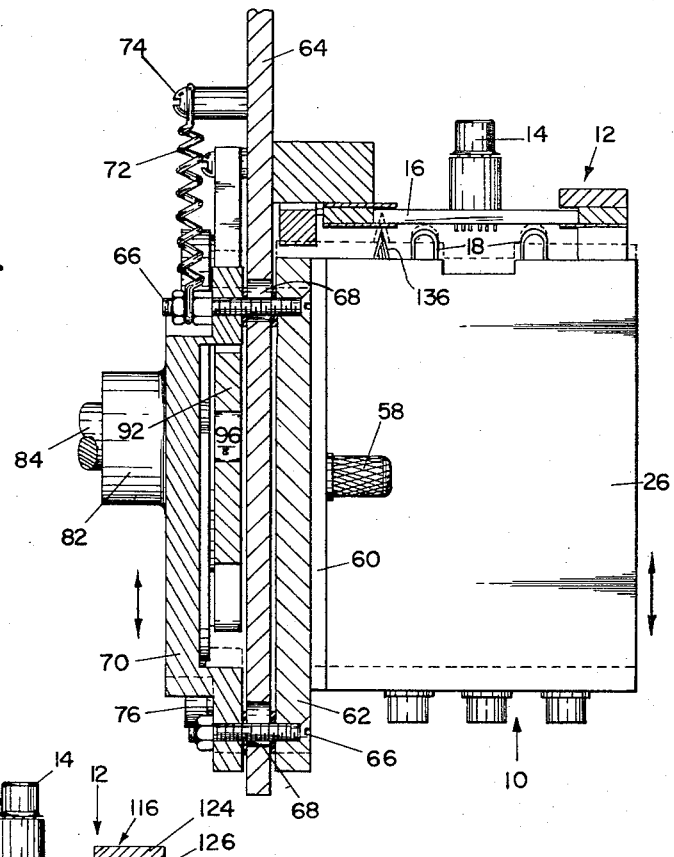
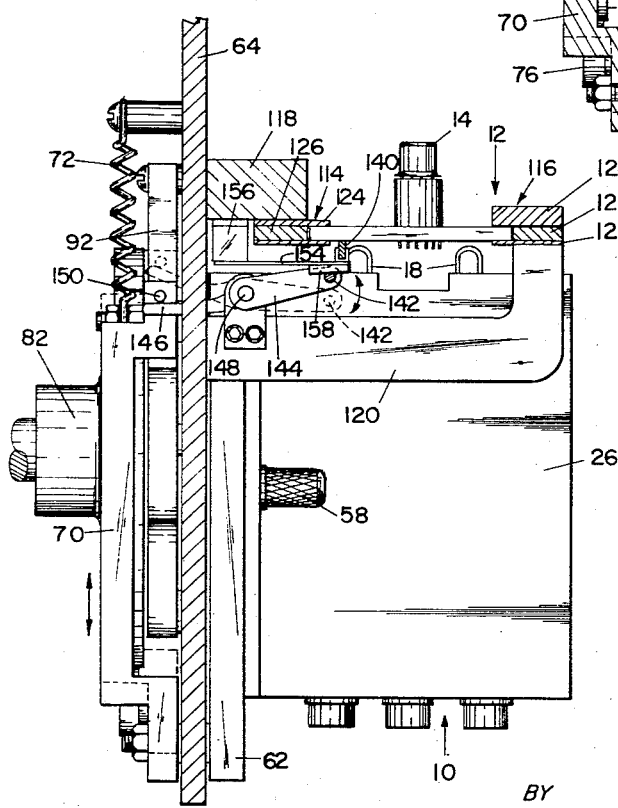
SAMUEL R. McCUTCHEON
INVENTOR.
BY
BUCKHORN, BLORE, KLARQUIST & SPARKMAN
ATTORNEYS Jan. 9, 1968  S. R. McCUTCHEON  3,363,179
APPARATUS FOR AUTOMATICALLY TESTING ELECTRONIC DEVICES
WITH MOVABLE PROBE CONTAINING A TEST CIRCUIT
Filed March 23, 1964  4 Sheets-Sheet 4

SAMUEL R. McCUTCHEON
INVENTOR.
BY
BUCKHORN, BLORE, KLARQUIST & SPARKMAN
ATTORNEYS

United States Patent Office 3,363,179
Patented Jan. 9, 1968

3,363,179
APPARATUS FOR AUTOMATICALLY TESTING ELECTRONIC DEVICES WITH MOVABLE PROBE CONTAINING A TEST CIRCUIT
Samuel R. McCutcheon, Beaverton, Oreg., assignor to Tektronix, Inc., Beaverton, Oreg., a corporation of Oregon
Filed Mar. 23, 1964, Ser. No. 354,008
13 Claims. (Cl. 324—158)

ABSTRACT OF THE DISCLOSURE

The subject matter of the present invention relates generally to electrical testing apparatus and in particular apparatus for automatically testing electronic devices, such as semiconductor devices containing integrated circuits, transistors, vacuum tubes, tunnel diodes and other signal translating devices. The testing apparatus includes a movable probe containing a test circuit and probe contacts extending out of such probe and electrically connected to the test circuit which enables the testing of high frequency characteristics.

---

Briefly, one embodiment of the present invention includes a probe housing containing a test circuit and a plurality of probe contacts connected to such test circuit. The probe contacts extend out of such housing so that they may be moved into engagement with fixed contacts on one side of a printed circuit board. The electronic device under test is mounted on the printed circuit board with its leads connected to the fixed contacts of such board so that such electronic device is connected to the test circuit within the probe when the probe contacts engage such fixed contacts. An automatic feeding mechanism intermittently moves the printed circuit boards into and out of a test position adjacent the probe housing and such probe housing is automatically moved toward and away from such printed circuit boards to respectively close and open the connections between the probe contacts and the fixed contacts. Spring wires are employed as the probe contacts to enable the probe housing to be positioned closer to the printed circuit boards so that the test circuit within such housing is connected to the electronic device by shorter electrical leads to reduce the distortion of high frequency signals transmitted between such device and such test circuit. In addition, shield plates are provided between adjacent pairs of probe contacts to enable such pairs of contacts to be placed close together without causing signal distortion due to electrostatic induction.

The present automatic testing apparatus has several advantages over the conventional testing apparatus of this type including the ability to test high frequency electronic devices with substantially no signal distortion. In addition, the testing apparatus of the present invention is extremely compact and light weight. Also, this testing apparatus has a simple and inexpensive structure. Furthermore, the present test apparatus operates in a fast, efficient and reliable manner to test complex electronic devices entirely automatically. This improved operation is due in part to the fact that a single electrical motor of small size is employed as the source of power for all moving parts in the apparatus.

It is therefore one object of the present invention to provide an improved apparatus for automatically testing a plurality of electronic devices in a fast and efficient manner.

Another object of the invention is to provide an improved testing apparatus for high frequency electronic devices which is capable of transmitting high frequency signals between such devices and a test circuit with substantially no distortion.

A further object of the present invention is to provide an improved electrical testing apparatus which has a relatively simple and inexpensive structure that is compact and light weight.

An additional object of the invention is to provide an automatic testing apparatus which is extremely versatile in that it can be employed to test a plurality of different electronic devices.

Still another object of the invention is to provide an automatic electrical testing apparatus which operates in a fast, efficient and trouble free manner.

Other objects and advantages of the present invention will be apparent from the following detailed description of a preferred embodiment thereof and from the attached drawings of which:

FIG. 1 is an end view of one embodiment of the automatic testing apparatus of the present invention with parts broken away to show internal construction;

FIG. 2 is a partial vertical section view taken along the line 2—2 of FIG. 1;

FIG. 5 is a horizontal section view taken along the line 5—5 of FIG. 4 showing a portion of the feeding mechanism;

FIG. 6 is a vertical section view taken along the line 6—6 of FIG. 3;

Figure 3:
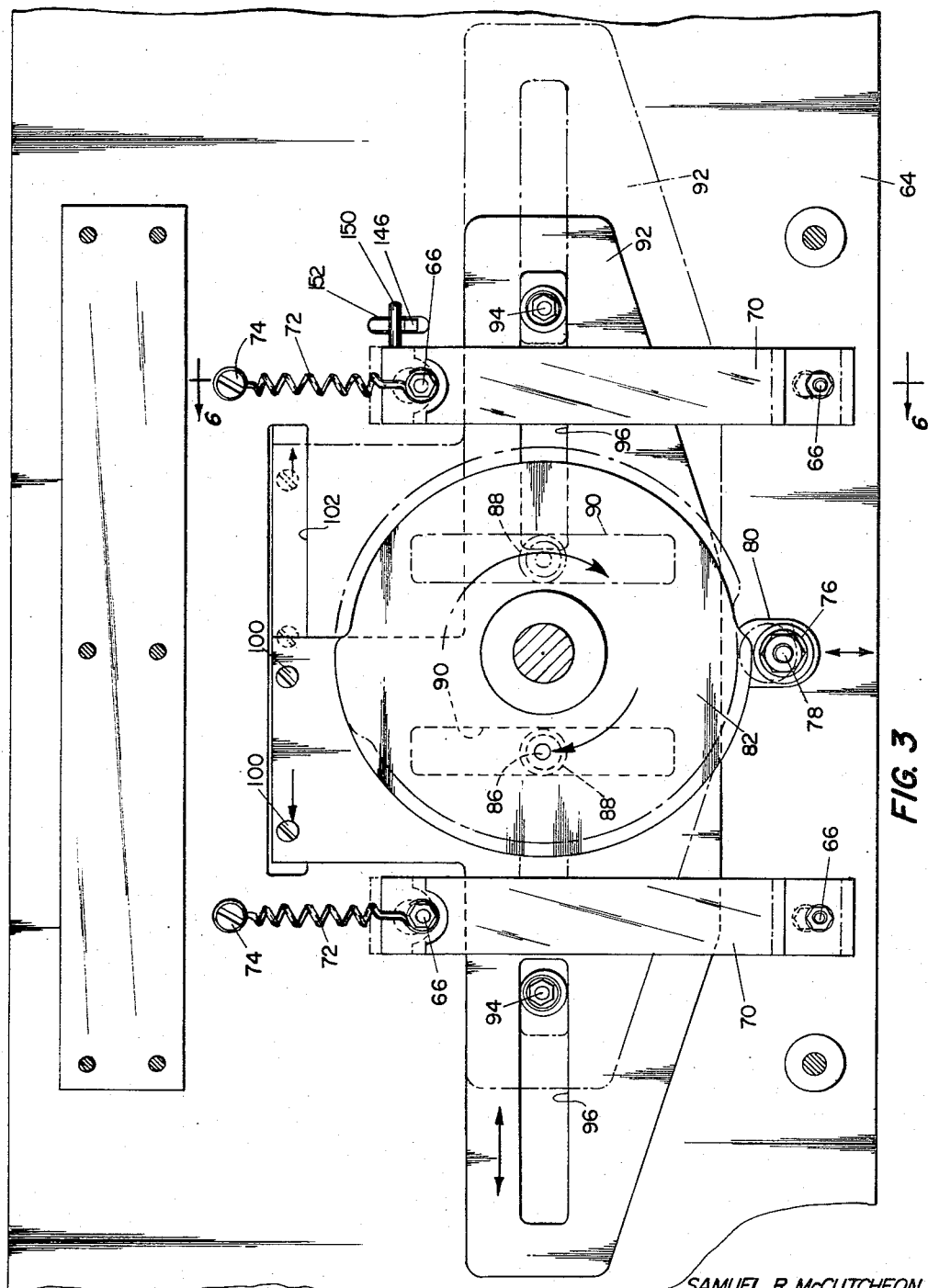
FIG. 3 is a vertical section view taken along the line 3—3 of FIG. 1 showing the cam of the operating mechanism rotated 90 degrees clockwise from the position shown in FIG. 1.

As shown in FIG. 1, one embodiment of the automatic testing apparatus of the present invention includes briefly a testing probe 10 supported beneath a track 12 for intermittently making electrical connection with one of a plurality of electronic devices 14, such as transistors, vacuum tubes, tunnel diodes, or semiconductor devices containing integrated circuits. The electronic devices are mounted on insulator support plates having conductive contacts, such as printed circuit boards 16, which are moved along such track in a manner hereafter described. The test probe 10 is moved between the lowered position shown and a raised position shown in dotted lines to cause a plurality of probe contacts 18 extending from the top of the test probe to be moved first into engagement and then out of engagement with fixed contacts 20 on the bottom side of the printed circuit boards. This is accomplished by the same operating mechanism which moves the printed circuit boards 16 along track 12 and such operating mechanism includes an electric motor 22 and a drive mechanism 24 connected to the shaft of such motor.

The test probe 10, shown in detail in FIGS. 1 and 2, includes a hollow metal housing 26 having a plurality of coaxial cable connectors 27 extending through the bottom of such housing and the probe contacts 18 extending through the top of such housing. Each of the probe contacts 18 may be in the form of a wire spring bent with a U-shaped switch contact portion 28, a horizontal lead portion 29 extending from such contact portion and a vertical terminal portion 31 extending from the lead portion. Several pairs of probe contacts may be employed with the contacts of each pair being mounted in spaced insulated relationship by clamping between one of a plurality of pairs of spacer members 30 and 32. Spacer member 30 is provided with a pair of cavities 34 to enable movement of the probe contacts into and out of the spacer member. As shown in FIG. 2, these several pairs of probe contacts 18 and their spacer members are clamped between a pair of metal support blocks 36 and 38 by three bolts 40 extending through the spacer members and threaded into support block 38. The support blocks are each supported at the top of the housing 26 by means of bolts 42 extending through such housing into such support blocks. Each pair of probe contacts 18 is also separated from its adjacent pair of contacts by an electrostatic shield plate 44 of brass or other suitable metal which is positioned between the spacer member 30 and the spacer member 32 of adjacent pairs of contacts. These shield plates are grounded to the probe housing and prevent high frequency signals applied to the probe contacts 18 from causing distortion of the signal on adjacent contacts.

The end terminal 31 of each of the probe contacts 18 is connected by a short lead wire 46 to an electrical test circuit 47 mounted within the probe housing 26 on a printed circuit board 48 supported inside such housing for movement with the housing. The test circuit is capable of automatically performing high frequency tests on the signal translating device 14 and is shielded from external electrical fields by metal housing 26. This mounting of the test circuit within the probe, together with the thinness of the printed circuit boards 16, enables the transistors, capacitors, resistors, etc. of the test circuit to be positioned a very short distance from the electronic devices 14 under test to reduce the waveform distortion of high frequency signals transmitted between such test circuit and the electronic device due to the inductance of the leads. These high frequency signals are transmitted from such test circuit through coaxial cables to a remote monitoring device such as a cathode ray oscilloscope without any appreciable distortion. It should be noted that each of the spacer members 30 and 32, as well as the shield member 44 is provided with a notch 50 in its upper edge between the probe contacts to provide clearance for the electrical leads 52 of the socket 54 in which the electronic device 14 is mounted. Each of these socket leads 52 extends through a different hole in the printed circuit board 16 which may be provided with a metal coating 56 to insure good electrical connection to the fixed contacts 20. Also, the nature of the test circuit 46 varies depending upon the electronic device being tested and may include a signal generator as well as the bias and load impedances for such electronic device. In addition, such test circuit may also include a signal sampling gate of the diode bridge type conventionally employed with sampling oscilloscopes.

The test probe 10 is mounted by a pair of thumb screws 58 which extend through the back plate 60 of probe housing 26 into a support plate 62. As shown in FIGS. 3 and 6, the support plate 62 is mounted on a front panel 64 of the testing apparatus by means of two pairs of bolts 66 which extend through four oversized holes 68 in such front panel and are secured to the ends of a pair of mounting brackets 70. The upper bolts 66 attached to the mounting brackets 70, are each connected by means of a coil spring 72 to an anchor bolt 74 attached to the front panel 64 for normally urging such support bracket and the probe housing connected thereto, into the uppermost position shown in dotted lines. In this uppermost position of the probe housing 26, the probe contacts 18 engage the fixed contacts 20 on the printed circuit board 16 to connect the electronic device 14 mounted on such board to the test circuit. The test probe is moved downward to the position shown in solid lines by means of a cam follower 76 shown in FIGS. 1 and 3, which is attached by means of a bolt 78 to the support plate 62 since such bolt extends through an oversized hole 80 in the front panel 64. Cam follower 76 travels along the outer edge of a circular cam 82 which is attached by means of set screws to the shaft 84 of the electric motor 22 for rotation with such shaft. As shown in FIG. 3, the cam 82 is provided with a raised cam surface over approximately 180 degrees for holding the cam follower 76 in the down position shown during the rotation of such cam through one half a revolution. The remainder of such cam is provided with an outer surface of less radius which enables the cam follower to rise to the upper position shown in dotted lines due to the force of springs 72.

As shown in FIGS. 1 and 3, the drive mechanism 24 also includes a pin 86 secured to the side of the cam 82 between the axis and outer surface of such cam. This pin is provided with a ball bearing mounted roller 88 which rides in an elongated vertical slot 90 provided through a scotch yoke member 92. This yoke is supported between the cam 82 and the front panel 64 on a pair of spaced guide rollers 94 attached to such front panel which ride in elongated vertical slots 96 provided in such yoke. Thus, the drive pin 86 and guide rollers 94 provide the yoke with a reciprocating horizontal movement between the left position shown by solid lines and the right position shown by phantom lines in FIG. 3. In this manner the yoke makes one complete back and forth movement for each revolution of the cam 82.

Figure 4:
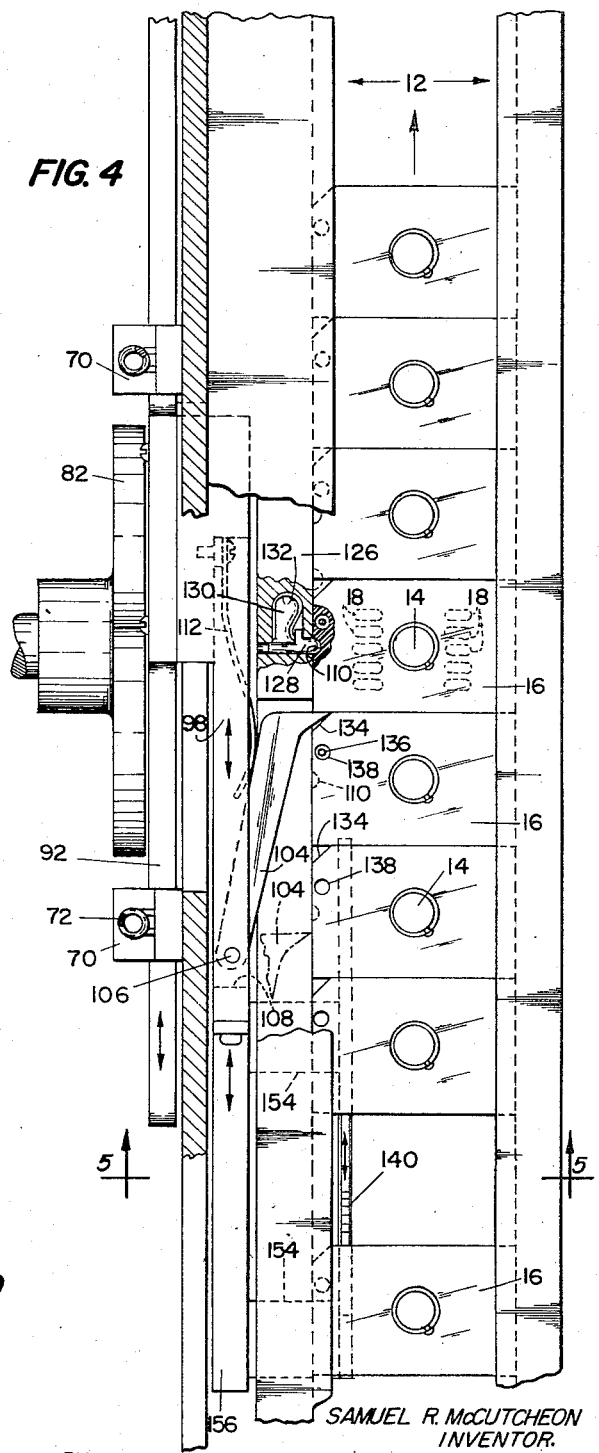
FIG. 4 is a plan view taken along the lines 4—4 of FIG. 1 with parts broken away for clarity.

As shown in FIGS. 1 and 4, a slider member 98 is attached by means of bolts 100 to the top of the yoke 92 for reciprocating movement therewith through a slot 102 provided in the front panel 64. A dog member 104 is pivotally attached to such slider member by a pivot pin 106 at one end thereof. The slider member 98 is provided with a narrow slot 108, as shown in FIG. 1, to limit the vertical movement of the dog member 104 so that the tip of such dog member engages the rear edge of the printed circuit board 16 and does not engage a detent notch 110 provided in the side edge of such board. A leaf spring 112 is mounted within the notch 108 so that one end of such spring is attached to the slider member and the other end of the spring engages the dog member 104 urging such dog member into engagement with the printed circuit board.

Figure 8:
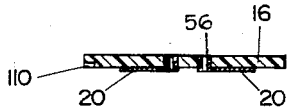
FIG. 8 is a horizontal section view taken along the line 8—8 of FIG. 7.
Figure 7:
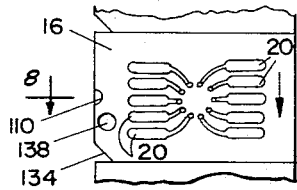
FIG. 7 is a plan view of the bottom side of one embodiment of printed circuit boards employed in the testing apparatus of the present invention.

As shown in FIGS. 4, 7 and 8, one embodiment of the printed circuit board 16 is provided with only one set of fixed contacts 20 and socket pin apertures for supporting a single electronic device 14 thereon. The fixed contacts 20 are provided in two groups of contacts aligned with each other in the direction of travel of the board 16 at the opposite sides of the boards, as shown in FIG. 7. Each of these individual printed circuit boards 16 is mounted on the track 12 for sliding movement between a pair of guides 114 and 116 spaced apart by the width of such circuit board and supported by means of brackets 118 and 120, respectively, on the front panel 64, as shown in FIG. 5. Each of the guides 114 and 116 includes a pair of guide plates 122 and 124 separated by a spacer member 126 which is slightly greater in thickness than the printed circuit boards to enable such boards to slide between such guide plates.

A detent member 128 is mounted within a cavity 130 within the spacer member 126 of the guide 114, as shown in FIG. 4. This detent member is resiliently urged outward through the side of such spacer member into the detent notch 110 of one of the printed circuit boards 16 when such one board is placed in the test position adjacent such detent. A leaf spring 132 mounted within the cavity 130 engages the detent member 128 to urge it outward into the path of the printed circuit boards. Thus, the printed circuit board is held stationary by means of the detent 128 in the test position so that the probe contacts 18 of the test probe mounted beneath such printed circuit board are aligned with the fixed contacts 20 on such circuit board.

The dog 104 is moved between the position shown in solid lines and the position shown in phantom lines in FIG. 4 by the slider member 98. The tip of such dog engages the rear edge of one of the printed circuit boards when such dog is moved due to the fact that the leaf spring urges such dog into the notch provided by the mitered corner 134 of the adjacent subsequent circuit board. As the dog member 104 continues to move, it pushes the printed circuit board 16, engaged by its front edge, into the test position where the detent 134 engages the detent notch 110 in such board. This is accomplished by rotating the cam pin 86 and roller 88 clockwise 180 degrees from the position shown in phantom lines to the position shown in dotted lines. During this time the cam follower 76 is urged so that the probe contacts 18 are positioned out of engagement with the printed circuit board.

As the cam continues to rotate clockwise from the position shown in FIG. 3, the cam follower 76 rises so that the probe contacts 18 are moved upward into engagement with the fixed contacts 20 on the printed circuit board after such printed circuit board is moved to the test position by dog 104. At the same time the dog 104 is moved from the solid line position shown in FIG. 4 to the phantom line position. As noted above, during this backward movement of the dog across the side of the next printed circuit board, the tip of the dog does not engage the detent notch 110 due to the fact that such dog is limited to its vertical movement by the slot 108 in the slider member 98. Furthermore, the next printed circuit board following the printed circuit board in the test position is held by means of a conical stop pin 136 extending through a circular aperture 138 in such next circuit board. The pin 136 is mounted on the test probe and extends from the top of the probe housing, as shown in FIGS. 2 and 4, so that such pin only engages the aperture 138 when such test probe is raised to its upper position. This stop pin 136 prevents the dog 104 from dragging the next printed circuit board back with it as it returns to the lower position shown in phantom lines and maintaining such circuit board in contact with the circuit board in the test position.

In addition to the dog mechanism, an additional feeding mechanism may be provided for moving the printed circuit boards into position to be engaged by such dog. As shown in FIGS. 4 and 5, this additional feeding mechanism may include a rubber coated feeder bar 140 which is moved upward into engagement with the printed circuit board by means of a pressure rod 142 which is pivotally connected by a pair of links 144 to the support brackets 120 of the guide 116. An actuating rod 146 is connected to link 144 for pivoting such link about a pivot pin 148 so that such actuating rod is engaged by a projection 150 on one of the support brackets 70 for the test probe. As shown in FIG. 3, the actuating rod 146 extends through a slot 152 in the front panel and is engaged by downward movement of the projection 150 to pivot the pressure rod 142 upward during downward movement of the probe housing 26. When the pressure rod 142 moves to the upper position shown in solid lines in FIG. 5, such rod engages the lower surface of the support for the feeder bar 140 and moves such feeder bar upward into contact with the bottom of the printed circuit board. As indicated above, after the probe housing 126 is in the lower position and the feeder bar is in engagement with the printed circuit board, the scotch yoke 92 of FIG. 3 is moved to the left by rotation of the cam pin from the phantom position to the dotted position. As a result, the slider 98 moves in the feeding direction of the printed circuit boards in FIG. 4. The feeder bar 140 is also connected to the slider member by means of a pair of leaf springs 154 and a support member 156 attached between such slider and such springs. These springs urge the feeder bar downward and normally out of engagement with the printed circuit board. Thus, the feeder bar is also moved in a reciprocating back and forth manner similar to dog 104. As a result, the feeder bar 140 moves up into contact with the printed circuit boards toward the test position. Next, such feeder bar moves downward out of contact with such printed circuit board and finally back in a reverse direction to its starting position. This reciprocating up and down, as well as back and forth, movement feeds the individual printed circuit board into a position to be engaged by the dog 104.

It should be noted that the pressure rod 142 slides on the leaf springs 154 when such springs are moved back and forth, due to the fact that such springs normally urge such feeder bar downward onto the pressure rod and away from the printed circuit board. For this reason the lower surface of the springs may be provided with an antifriction coating 158 of Teflon or other suitable plastic material. In a similar manner, the surface of the cam 82 which engages the yoke 92 during relative rotation and sliding movement of these members, may be provided with an antifriction coating of similar plastic material. Furthermore, four antifriction spacer inserts of plastic material, such as Delrin, may be provided in the surface of the yoke 92 which slides on the front panel 64.

Figure 9:
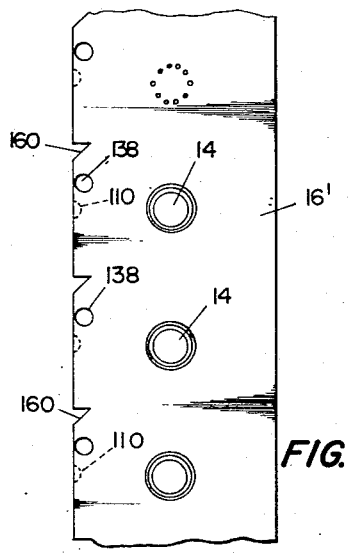
FIG. 9 is a plan view of the top side of another embodiment of the printed circuit board.

A second embodiment of the printed circuit board is shown in FIG. 9 to be an elongated board 16' on which a plurality of electronic devices 14 may be mounted. Thus, the printed circuit board 16' of FIG. 9 is similar to the individual circuit board 16 of FIGS. 7 and 8 except that several of these individual boards have been joined into one single board having a plurality of sets of socket pin holes and fixed contacts along with a plurality of V-shaped notches 160 between adjacent sets of contacts, into which the dog 104 extends for engagement with such printed circuit board.

It will be obvious to those having ordinary skill in the art that various changes may be made in the details of the above described preferred embodiment of the present invention without departing from the spirit of the invention. For example, a sorting mechanism may be added to the outlet end of the track 12 to sort the individual printed circuit boards into two separate groups one of which contains satisfactory electronic devices which have passed the test and the other of which contains rejected electronic devices which have failed the test. Of course, this is not possible when employing the elongated printed circuit board of FIG. 9 but in this case the rejected devices may be labeled with paint to indicate their defectiveness. Also, many other types of drive mechanisms and feeding mechanisms may be employed. For these reasons the scope of the present invention should only be determined by the following claims.

I claim:

1. Apparatus for automatically testing electrical signal translating devices, comprising:

movable probe means including a housing containing both a test circuit and a plurality of spaced, insulated probe contacts extending out of said housing and supported adjacent said test circuit and connected to said test circuit, said test circuit including active and passive circuit components and being capable of automatically performing high frequency tests on said devices when connected thereto, and means for shielding said circuit from electrical fields external of said housing;

support means for holding a plurality of said devices with the electrical leads of each of said devices connected to a different one of a plurality of spaced insulated fixed contacts on said support means;

feeder means for moving said support means to successively place each of said devices into a test position adjacent said probe means for a brief time period and to subsequently move said devices out of said test position; and motor means for moving said probe means including said test circuit toward said support means to cause said probe contacts to engage the fixed contacts connected to one of the signal translating devices when said one device is in said test position to connect said one device to said test circuit, and for moving said probe means away from said support means to disengage said probe contacts from said fixed contacts before another device is moved into said test position.

2. Apparatus for automatically testing electrical signal translating devices, comprising:

movable probe means including a housing containing both a test circuit and a plurality of spaced, insulated probe contacts extending out of said housing and connected to said test circuit, means for shielding said contacts from each other, said test circuit including active and passive circuit components and being capable of automatically performing high frequency tests on said devices when connected thereto, and means for shielding said circuit from electrical fields external of said housing;

support means for holding a plurality of said devices with the electrical leads of each of said devices connected to a different one of a plurality of spaced insulated fixed contacts on said support means;

feeder means for automatically moving said support means to successively place each of said devices into a test position adjacent said probe means for a brief time period and to subsequently move said devices out of said test position; and means for automatically moving said probe means toward said support means to cause said probe contacts to engage the fixed contacts connected to one of said devices when said one device is in said test position to connect said one device to said test circuit, and for moving said probe means away from said support means to disengage said probe contacts from said fixed contacts before another device is moved into said test position.

3. Apparatus for automatically testing electrical signal translating devices, comprising:

movable probe means including a metal housing containing both a test circuit and a plurality of spaced, insulated probe contacts extending out of said housing and connected to said test circuit, a plurality of metal members between certain of the probe contacts for shielding said contacts from each other, said test circuit including active and passive circuit components and being capable of automatically performing high frequency tests on said devices when connected thereto, and means for shielding said circuit from electrical fields external of said housing;

support means including a plurality of printed circuit boards for holding a plurality of said devices with the electrical leads of each of said devices connected to a different one of a plurality of spaced insulated fixed contacts on said boards;

feeder means for intermittently moving said boards to successively place each of said devices into a test position adjacent said probe means for a brief time period and subsequently to move said devices out of said test position; and means for automatically moving said probe means toward said support means to cause said probe contacts to engage the fixed contacts connected to one of said devices when said one device is in said test position to connect said one device to said test circuit, and for moving said probe means away from said support means to disengage said probe contacts from said fixed contacts before another device is moved into said test position.

4. Apparatus for automatically testing high frequency signal translating devices, comprising:

movable probe means including a housing containing both a test circuit and a plurality of spaced, insulated probe contacts extending out of said housing and connected to said test circuit, said test circuit including active and passive circuit components and being capable of performing high frequency tests on said devices;

support means for holding a plurality of said devices with the electrical leads of each of said devices connected to a different one of a plurality of spaced insulated fixed contacts on said support means, at least some of said fixed contacts being aligned with each other in the direction of movement of said support means;

feeder means for automatically moving said support means to successively place each of said devices into a test position adjacent said probe means for a brief time period and to subsequently move said devices out of said test position;

actuating means for automatically moving said probe means toward said support means to cause said probe contacts to engage the fixed contacts connected to one of said devices when said one device is in said test position to connect said one device to said test circuit, and for moving said probe means away from said support means to disengage said probe contacts from said fixed contacts before another device is moved into said test position;

a common motor means; and drive means for connecting said motor means to operate both said feeder means and said actuating means simultaneously.

5. Automatic testing apparatus for high frequency electronic devices, comprising:

a plurality of support plates each having a plurality of spaced insulated fixed contacts provided on one side thereof;

a plurality of fastening means for mounting at least one of the devices on each of said support plates with the electrical leads of said devices connected to different ones of said contacts;

a hollow probe housing;

a test circuit supported within said housing, said test circuit including active and passive circuit components and being capable of performing high frequency tests on said devices;

a plurality of probe contacts supported partially inside and outside of said housing and connected to said test circuit, said housing, said test circuit, and probe contacts forming a movable probe means;

a plurality of spacer members of insulating material mounted within said housing to hold said probe contacts in spaced insulated relationship with a portion of each of such contacts extending out of said housing substantially the same distance;

a track for guiding said support plates toward and away from a test position adjacent said probe housing; and means for moving said probe housing and said test circuit toward and away from said support plates to cause said probe contacts to engage and to disengage said fixed contacts.

6. Automatic testing apparatus for high frequency semiconductor devices, comprising:

a plurality of support plates each having a plurality of spaced insulated fixed contacts provided on one side thereof;

a plurality of fastening means for mounting one of the semiconductor devices on each of said support plates with the electrical leads of said devices connected to different ones of said fixed contacts;

a hollow probe housing;

a test circuit supported within said housing, said test circuit including active and passive circuit components and being capable of performing high frequency tests on said devices;

a plurality of spring biased contacts supported partially inside and outside of such housing and connected to said test circuit, said housing, test circuit, and spring contacts forming a movable probe means;

a plurality of spacer members of insulating material mounted within said housing to hold said spring contacts in spaced insulated relationship with a portion of each of such contacts extending out of said housing substantially the same distance;

a plurality of shield members of conducting material supported between said spacer members to shield said spring contacts from each other;

a track for guiding said support plates toward and away from a test position adjacent said probe housing;

means for moving said probe means to cause said spring contacts to engage the fixed contacts of a support plate when said support plate is in said test position; and a dog member mounted adjacent said track for engagement with the support plates to move said support plates along said track into said test position.

7. Automatic testing apparatus for high frequency semiconductor devices, comprising:

a plurality of printed circuit boards each having a plurality of spaced insulated fixed contacts provided in alignment on at least one side thereof;

a plurality of fastening means for mounting at least one of the semiconductor devices on each of said boards with the electrical leads of said devices connected to different ones of said contacts;

a hollow probe housing;

a test circuit supported within said housing, said test circuit including active and passive circuit components and being capable of performing high frequency tests on said devices;

a plurality of spring biased contacts supported in said housing and connected to said test circuit, said housing, said test circuit and said spring contacts forming a movable probe means;

a plurality of spacer members of insulating material mounted within said housing to hold said spring contacts in spaced insulated relationship with a portion of each of such contacts extending out of said housing substantially the same distance;

a plurality of shield members of conducting material supported between said spacer members to shield said spring contacts from each other;

a track for guiding said printed circuit boards toward and away from a test position adjacent said probe housing;

means for moving said probe means to cause said spring contacts to engage the fixed contacts of one of said boards when said one board is in said test position;

a dog member mounted adjacent said track for engagement with the circuit boards to move said boards along said track into said test position; and a detent mounted on said track for engagement with a notch in each of the support plates to hold one of said support plate in said test position.

8. Automatic testing apparatus for high frequency semiconductor devices, comprising:

a plurality of support plates each having a plurality of spaced insulated fixed contacts provided on one side thereof;

a plurality of fastening means for mounting one of the semiconductor devices on each of said support plates with the electrical leads of said devices connected to different ones of said contacts;

a hollow probe housing;

a test circuit supported within said housing, said test circuit including active and passive circuit components and being capable of performing high frequency tests on said devices;

a plurality of spring biased contacts supported on said housing and connected to said test circuit;

a plurality of spacer members of insulating material mounted within said housing to hold said spring contacts in spaced insulated relationship with a portion of each of such contacts extending out of said housing substantially the same distance;

a plurality of shield members of conducting material supported between said spacer members to shield said spring contacts from each other;

a track for guiding said support plates toward and away from a test position adjacent said probe housing;

a dog member mounted adjacent said track for engagement with the support plates to move said support plates along said track into said test position;

a detent mounted on said track for engagement with a notch in each of the support plates to hold one of said support plates in said test position;

an electric motor; and drive means for connecting said motor to said probe housing and to said dog member to drive said dog member in a reciprocating manner in order to intermittently move said support plates into and out of said test position, and to move said housing in a reciprocating manner toward and away from said track so that the spring contacts of the probe engage the fixed contacts of the support plate in said test position to connect the semiconductor device on such support plate to said test circuit and then disengage from such fixed contacts while another support plate is moved into said test position.

9. Apparatus for automatically testing electrical signal translating devices, comprising:

a movable probe including a test circuit contained within said probe and a plurality of pairs of resilient probe contacts connected to said test circuit which includes active and passive circuit components and is capable of performing high frequency tests on said devices, each pair of probe contacts being supported in spaced, insulated relationship between a pair of spacer members of insulating material which enable the contacts to bend, said pairs of probe contacts being separated by a plurality of electrostatic shield plates positioned between adjacent pairs of spacer members;

a thin support plate of insulating material having a plurality of pairs of spaced fixed contacts of conducting material provided on one side of said plate, and a plurality of holes extending through said plate between the individual contacts of each pair of fixed contacts, each of said fixed contacts being provided with an electrical lead extending into a different one of each of said holes;

means for attaching at least one signal translating device to the other side of said support plate and for connecting the leads of said fixed contacts connected to the electrodes of said device through said holes; and mounting means for connecting the probe to a motor moving said probe toward and away from said support plate to cause said probe contacts to move into and out of engagement with said fixed contacts.

10. An electrical probe apparatus for automatically testing electrical signal translating devices, comprising:

a probe housing;

a plurality of spaced insulated probe contacts supported by said housing and at least partially extending out of said housing;

a test circuit supported within said housing adjacent said contacts and connect to said contacts, said test circuit including active and passive circuit components and being capable of automatically performing high frequency tests on signal translating devices connected thereto by said contacts; and motor means connected to the probe housing for automatically moving said housing, said contacts, and said test circuit toward and away from said devices to electrically connect and disconnect said contacts and said devices.

11. A probe apparatus in accordance with claim 10 in which the probe contacts are spring contacts arranged in pairs, and a plurality of shield plates are positioned between adjacent pairs of contacts.

12. A probe apparatus in accordance with claim 10 which also includes an alignment element extending from the housing adjacent the probe contacts and engaging holes in support plates of insulating material on which the signal translating devices are mounted and have their leads connected to contacts on said support plates, to position said support plates with their contacts in alignment with said probe contacts.

13. A probe apparatus in accordance with claim 10 which also includes means for automatically feeding the signal translating devices into position to be connected to the probe contacts upon movement of the probe housing into a test position.

References Cited
UNITED STATES PATENTS

| | | | |
|---|---|---|---|
| 2,685,673 | 8/1954 | Avins | 324—72.5 |
| 2,887,622 | 5/1959 | Rayburn. | |
| 2,918,648 | 12/1959 | Ludman | 324—158 X |
| 2,922,954 | 1/1960 | Bigelow | 324—158 |
| 3,009,109 | 11/1961 | Jankowski | 324—158 |
| 3,039,604 | 6/1962 | Bickel | 324—158 X |
| 3,059,215 | 10/1962 | Proskauer | 324—158 X |
| 3,114,586 | 12/1963 | Albert | 339—17 |
| 3,157,733 | 11/1964 | De Masi | 339—17 X |

RUDOLPH V. ROLINEC, *Primary Examiner.*

E. L. STOLARUN, *Assistant Examiner.*